United States Patent
Sargor et al.

(10) Patent No.: US 8,122,289 B2
(45) Date of Patent: Feb. 21, 2012

(54) LOAD BALANCING AND HIGH AVAILABILITY OF COMPUTE RESOURCES

(75) Inventors: Chandramouli Sargor, Sunnyvale, CA (US); Santosh Mamidi, Santa Clara, CA (US); Ravindra Narayan, Fremont, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 267 days.

(21) Appl. No.: 12/421,609

(22) Filed: Apr. 9, 2009

(65) Prior Publication Data

US 2010/0262860 A1 Oct. 14, 2010

(51) Int. Cl.
*G06F 11/00* (2006.01)

(52) U.S. Cl. ............... 714/13; 714/4.11; 714/4.12

(58) Field of Classification Search ........ 714/13, 714/4.11, 4.12
See application file for complete search history.

(56) References Cited

U.S. PATENT DOCUMENTS

| | | | |
|---|---|---|---|
| 6,314,526 B1 * | 11/2001 | Arendt et al. ............... 714/4 |
| 6,944,785 B2 * | 9/2005 | Gadir et al. ............... 714/4 |
| 7,516,221 B2 * | 4/2009 | Souder et al. ............... 709/226 |
| 7,646,708 B2 * | 1/2010 | McGee et al. ............... 370/229 |
| 7,873,693 B1 * | 1/2011 | Mehrotra et al. ............... 709/203 |
| 2004/0054780 A1 * | 3/2004 | Romero ............... 709/226 |
| 2006/0136490 A1 * | 6/2006 | Aggarwal et al. ............... 707/103 R |
| 2007/0234116 A1 * | 10/2007 | Yoshikawa et al. ............... 714/13 |

* cited by examiner

*Primary Examiner* — Philip Guyton
(74) *Attorney, Agent, or Firm* — Blakely Sokoloff Taylor & Zafman, LLP

(57) ABSTRACT

Compute resources of multiple resource cards are assigned to compute resource pools. Each compute resource pool is typically associated with a specific service (e.g., VoIP, video service, deep packet inspection, etc). Compute resource groups are created in each compute resource pool and are allocated one or more compute resources of that compute resource pool. Those compute resources in a given resource pool that are not allocated to a compute resource group are set as backup compute resources. Upon a failure of a compute resource in a compute resource pool that includes backup compute resources, a backup compute resource is selected and takes over the function of the failed compute resource. Upon a failure of a compute resource in a compute resource group of a compute resource pool that does not include a backup compute resource, the traffic is load balanced across the remaining compute resources of that compute resource group.

18 Claims, 10 Drawing Sheets

| VRID TABLE 134 | |
|---|---|
| VRID 610 | CR 620 |
| 1 | 120 |
| 2 | 130 |
| 3 | 124 |
| 4 | 122 |
| 5 | 126 |
| 6 | 144 |
| 7 | 144 |
| 8 | 146 |
| 9 | 146 |
| 10 | 144 |
| 11 | 146 |

FIG. 6B

| VRID TABLE 134 | |
|---|---|
| VRID 610 | CR 620 |
| 1 | 120 |
| 2 | 130 |
| 3 | 124 |
| 4 | 132 |
| 5 | 126 |
| 6 | 142 |
| 7 | 144 |
| 8 | 146 |
| 9 | 142 |
| 10 | 144 |
| 11 | 146 |

FIG. 6A

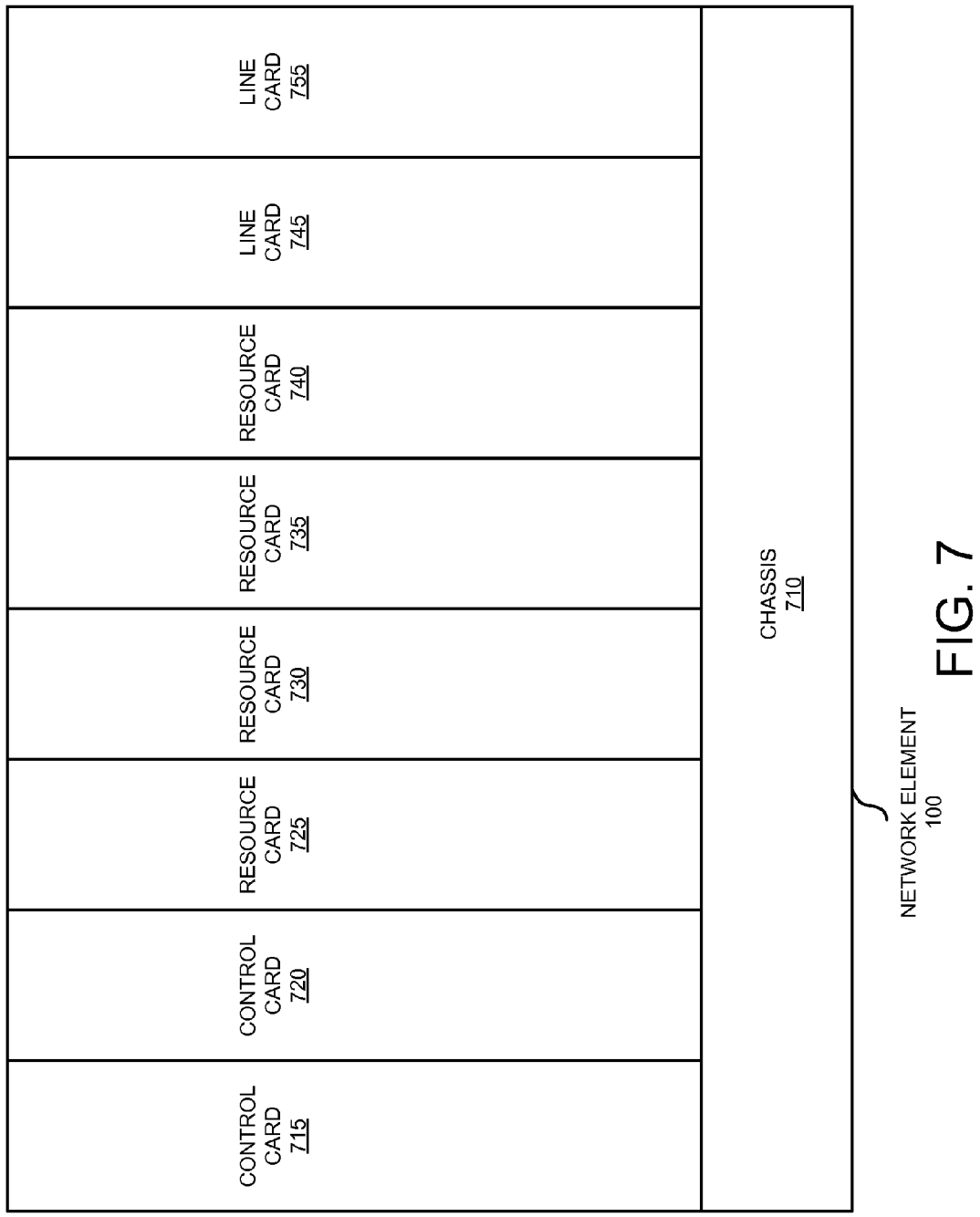

LOAD BALANCING AND HIGH AVAILABILITY OF COMPUTE RESOURCES

BACKGROUND

1. Field

Embodiments of the invention relate to the field of network processing; and more specifically, to the load balancing and high availability of compute resources.

2. Background

Typical existing load balancing implementations in network elements are static and require an operator to manually partition available resources (e.g., line cards, control cards, resource cards, etc.). Likewise, typical high availability implementations are static and require an explicit designation of resources as active or backup. For example, the operator assigns some line cards as active and others as backup. Typically, existing high availability implementations are limited to providing card level failure and require entire cards (e.g., control card, line card, resource card) to be designated as either active or backup.

BRIEF DESCRIPTION OF THE DRAWINGS

The invention may best be understood by referring to the following description and accompanying drawings that are used to illustrate embodiments of the invention. In the drawings:

FIG. 6A is a block diagram illustrating an exemplary virtual resource identification table according to one embodiment of the invention;

FIG. 6B is a block diagram illustrating the exemplary virtual resource identification table of FIG. 6A after a failure of compute resources according to one embodiment of the invention; and FIG. 7 is a block diagram illustrating an exemplary architecture of a network element according to one embodiment of the invention.

DETAILED DESCRIPTION

Figure 1:
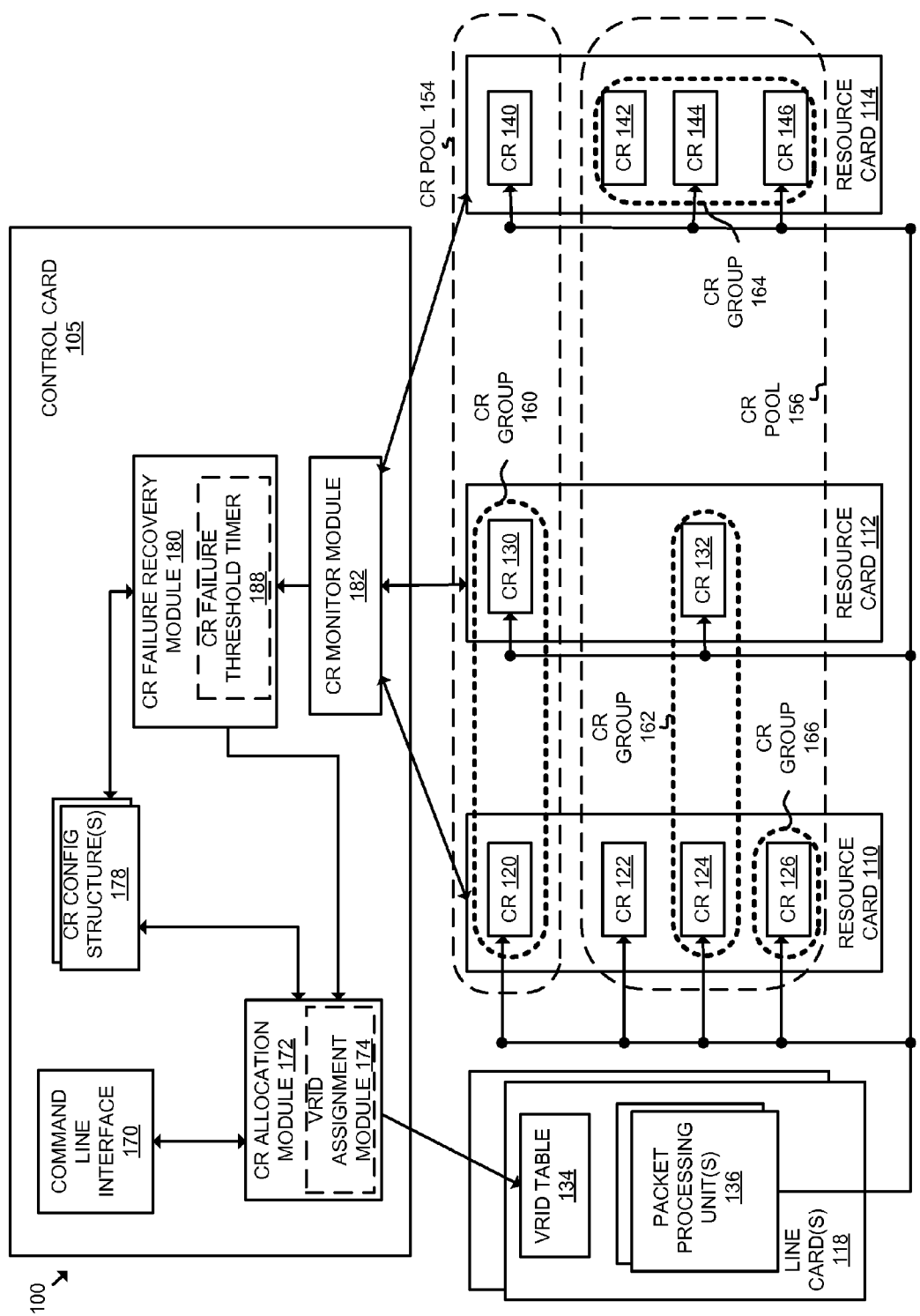
FIG. 1 illustrates an exemplary network element for load balancing and high availability of compute resources according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more electronic devices (e.g., a network element). Such electronic devices store and communicate (internally and/or with other electronic devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard, a touchscreen, and/or a display), and a network connection. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, computer end stations, etc.). Some network elements are "multiple services network elements" that provide support for multiple networking functions (e.g., routing, bridging, switching, Layer 2 aggregation, and/or subscriber management), and/or provide support for multiple application services (e.g., data, voice, and video). Subscriber computer end stations (e.g., workstations, laptops, palm tops, mobile phones, smartphones, multimedia phones, portable media players, GPS units, gaming systems, set-top boxes, etc.)

access content/services provided over the Internet and/or content/services provided on virtual private networks (VPNs) overlaid on the Internet. The content and/or services are typically provided by one or more server computer end stations belonging to a service or content provider, and may include public webpages (free content, store fronts, search services, etc.), private webpages (e.g., username/password accessed webpages providing email services, etc.), corporate networks over VPNs, etc. Typically, subscriber computer end stations are coupled (e.g., through customer premise equipment coupled to an access network (wired or wirelessly)) to edge network elements, which are coupled (e.g., through one or more core network elements to other edge network elements) to the server computer end stations.

Some network elements support the configuration of multiple contexts. As used herein, each context includes one or more instances of a virtual network element (e.g., a virtual router or a virtual bridge). Each context typically shares system resources (e.g., memory, processing cycles, etc.) with other contexts configured on the network element, yet is independently administrable. For example, in the case of multiple virtual routers, each of the virtual routers may share system resources but is separate from the other virtual routers regarding its management domain, AAA (authentication, authorization, and accounting) name space, IP address, and routing database(es). Multiple contexts may be employed in an edge network element to provide direct network access and/or different classes of services for subscribers of service and/or content providers.

A method and apparatus for load balancing and high availability of compute resources is described. In one embodiment of the invention, compute resources from multiple processing cards (e.g., resource cards and/or line cards) are shared across those multiple processing cards for different services. Each compute resource is assigned to a single resource pool. A resource pool may include multiple compute resources that may be distributed across the multiple processing cards. There may be multiple resource pools, each of which is typically associated with a specific service such as Voice over Internet Protocol (VoIP) service, video service, deep packet inspection (DPI), etc. One or more compute resource groups are created in each resource pool that use one or more of the compute resources assigned to that resource pool. Those compute resources in a given resource pool that are not allocated to a compute resource group are set as backup compute resources. Traffic is load balanced across the compute resources allocated for a particular resource group.

Upon a failure of a particular compute resource that is allocated for a particular resource group, if there are backup compute resources available in the compute resource pool the resource group belongs, one of those backup compute resources takes over the role of the failed compute resource. If there are no available backup compute resources, the traffic that would have been processed by the failed compute resource is balanced across the remaining compute resources in that resource group.

FIG. 1 illustrates an exemplary network element for load balancing and high availability of compute resources according to one embodiment of the invention. The network element 100 includes the control card 105, coupled with one or more line cards 118 and the resource cards 110, 112, and 114. The line card(s) 118 are coupled with the resource cards 110, 112, and 114. It should be understood that the number of cards illustrated is exemplary and other numbers of cards may be used in embodiments of the invention described herein. The control card 105, the one or more line card(s) 118, and the resource cards 110, 112, and 114 are each a type of processing card. The control card 105 performs signaling, routing (including creation of and/or management of routing tables), bridging (including creation of and/or management of bridging tables), connection setup, session setup, etc. The line card(s) 118 process packets including forwarding and/or switching packets at high speed. Some packets are redirected from the line card(s) 118 to one or more of the resource cards 110, 112, and 114 for advanced processing. For purposes of explanation, the load balancing and high availability of compute resources will be described in reference to the resource cards only, however it should be understood that the techniques described herein apply to line cards and/or a combination of line cards and resource cards in some embodiments of the invention.

A compute resource is a processing resource such as a processor, a processor core, a thread, a hyperthread, etc. The resource card 110 includes the compute resources 120, 122, 124, and 126; the resource card 112 includes the compute resources 130 and 132; and the resource card 114 includes the compute resources 140, 142, 144, and 146. Each of the one or more line cards 118 include one or more packet processing units 136 and a VRID (virtual resource identifier) table 134, which will be described in greater detail later herein.

The control card 105 includes the command line interface (CLI) 170, the compute resource allocation module 172, the compute resource configuration structure(s) 178, the compute resource failure recovery module 180, and the compute resource monitor module 182. The CLI 170 allows system operators to configure the network element 100 including the load balancing and high availability of the compute resources mechanism as will be described in greater detail later herein. The command line interface is coupled with the compute resource allocation module 172, which is in turn coupled with one or more compute resource configuration structure(s) 178, and the compute resource failure recovery module 180. The CR allocation module 172 also calls or has access to the VRID assignment module 174 which, among other things, populates the VRID tables 134 of the line card(s) 118.

The compute resource monitor module 182 monitors the status of the compute resources of the resource cards 110, 112, and 114 (e.g., operational or non-operational). The compute resource monitor module 182 provides the compute resource failure recovery module 180 of an identifier of a failed compute resource. The compute resource failure recovery module 180 recovers from failures of the compute resources. As will be described later herein, upon a failure of a particular compute resource that is allocated to a particular compute resource group, the compute resource failure recovery module 180 will attempt to cause the traffic that was associated with the failed compute resource to transition to being processed by one or more backup compute resources of the same compute resource pool if available. Thus, the compute resource failure recovery module 180 will attempt to cause a backup compute resource to take over the role of the failed compute resource. If no backup compute resources are available, the compute resource failure recovery module 180 will attempt to rebalance the traffic load that was served by the failed compute resource with the other compute resources in the same compute resource group as the failed compute resource (e.g., the rebalancing is subject to the current load of the other compute resources in the compute resource group). In one embodiment, the traffic is rebalanced only to the point that the load of the other compute resources of the compute resource group do not lose traffic (e.g., if a compute resource is currently experiencing an 70% load, that compute resource may be rebalanced to include approximately 20%-30% more traffic). In one embodiment, the traffic is rebalanced only to those other compute resources of the compute resource group whose load is below a threshold.

The compute resources are allocated to different compute resource pools. A compute resource pool is a collection of compute resources (including active and backup compute resources). In some embodiments, the compute resources of a given compute resource pool commonly provide a specific service (e.g., VoIP service, video on demand service, interactive gaming service, VPN service, deep packet inspection, etc.) and they each have the same system level attributes (e.g., same operating system/firmware version, etc.).

Each compute resource may further be allocated to a single compute resource group. A compute resource group is a collection of one or more compute resources within a compute resource pool that is used for purposes of defining the granularity of load balancing. A compute resource within a compute resource pool is allocated to only a single compute group (of that compute resource pool) at a time.

In one embodiment, a system operator of the network element 100 creates the compute resource pools 154 and 156. The system operator may provide a set of compute resource configuration parameters though use of the command line interface 170. For example, the compute resource pools 154 and 156 and one or more compute resources from the resource cards 110, 112, and 114 are assigned to the compute resources pools 154 and 156 according to the compute resource configuration parameters. The compute resources assigned to each compute resource pool may be from different resource cards. As illustrated in FIG. 1, the compute resource 120 of the resource card 110, the compute resource 130 of the resource card 112, and the compute resource card 140 of the resource card 114 are each assigned to the compute resource pool 154. The compute resources 122, 124, and 126 of the resource card 110, the compute resource 132 of the resource card 112, and the compute resources 142, 144, and 146 of the resource card 114 are each assigned to the compute resource pool 156.

Assignment of compute resources may occur differently in different embodiments of the invention. For example, in one embodiment, the system operator of the network element 100 selects which compute resources are to be assigned to each compute resource pool (e.g., compute resource 120 is to be assigned to the compute resource pool 154). In another embodiment, the system operator selects the number of compute resources to be assigned to a compute resource pool (e.g., compute resource pool 154 is to be assigned three compute resources) and the control card 105 selects from the available compute resources to fulfill the request. In yet another embodiment, the system operator provides a minimum amount of traffic that needs to be supported (e.g., traffic from X number of subscribers, etc.) for each compute resource pool and the control card 105 selects one or more of the available compute resources to fulfill the request.

The compute resource pool 154 may be associated with a different service than the compute resource pool 156. In addition, the compute resources of the compute resource 156 each have the same system level attributes which may be different than the system level attributes of the compute resources of the compute resource pool 154.

As illustrated in FIG. 1, the compute resource group 160 is included in the compute resource pool 154 and the compute resource groups 162, 164, and 166 are each included in the compute resource pool 156. Each compute resource group has one or more allocated compute resources. As illustrated in FIG. 1, the compute resources 120 and 130 are allocated to the compute resource group 160, the compute resources 124 and 132 are allocated to the compute resource group 162, the compute resource 126 is allocated to the compute resource group 166 (thus the compute resource 126 is dedicated to the compute resource group 166), and the compute resources 142, 144 and 146 are allocated to the compute resource group 164.

The compute resources in a compute resource pool which are not allocated to a compute resource groups are used as backup compute resources. As illustrated in FIG. 1, the compute resources 140 and 122 of the compute resource pools 154 and 156 respectively are not allocated to a compute resource group. Thus, the compute resource 140 is a backup compute resource in the compute resource pool 154 and the compute resource 122 is a backup compute resource in the compute resource pool 156.

In some embodiments, each compute resource group is associated with a priority value, which has been configured by a system operator. The priority values are used to decide which compute resource groups are allocated compute resources when the number of available compute resources in the compute resource pool is less than the total required (e.g., the higher priority group receives preference over a lower priority group). In addition, the priority value is used to decide which compute resource group is allocated a compute resource that is becoming operational after it has previously failed. In addition, the priority value may be used by a backup compute resource to give preferential treatment to the compute resources in a high priority compute resource group (e.g., during a congested state, when more sessions than a backup compute resource can handle (when it a failure of an active compute resource occurs), a lower priority compute resource's sessions may be replaced with a higher priority compute resource's sessions). Alternatively, resources on a backup compute resource may be statically partitioned based on the priority.

Each of the compute resource pools 154 and 156 may be configured (e.g., by the system operator of the network element 110) to operate in preemptive mode. For example, the compute resource configuration parameters may include whether the compute resource pool is to operate in preemptive mode. If operating in preemptive mode, failure of a compute resource in a compute resource group may result in a reallocation of compute resources from a lower priority compute resource group to a higher priority compute resource group. For example, responsive to a failure of a compute resource in a higher priority compute resource group, one or more compute resources from a lower priority compute resource group (of the same compute resource pool) may be preempted and reallocated to the higher priority compute resource group. The selected compute resource(s) for preemption may be done in different ways in different embodiments (e.g., the least loaded compute resource(s), the compute resource(s) with the lowest processing capability, the compute resource(s) with the highest processing capability, the compute resource(s) that most closely match the failed compute resource, etc.).

In one embodiment, preemptive behavior is limited to a subset of the compute resource groups in a compute resource pool by a configuration of a priority threshold. For example, only compute resource groups which have a priority higher than the priority threshold may be able to invoke preemptive behavior. In some embodiments, the priority threshold is configurable by system operators.

In one embodiment, each compute resource group is associated with a context. Each context may be associated with one or more compute resource groups at a given time.

Figure 2:
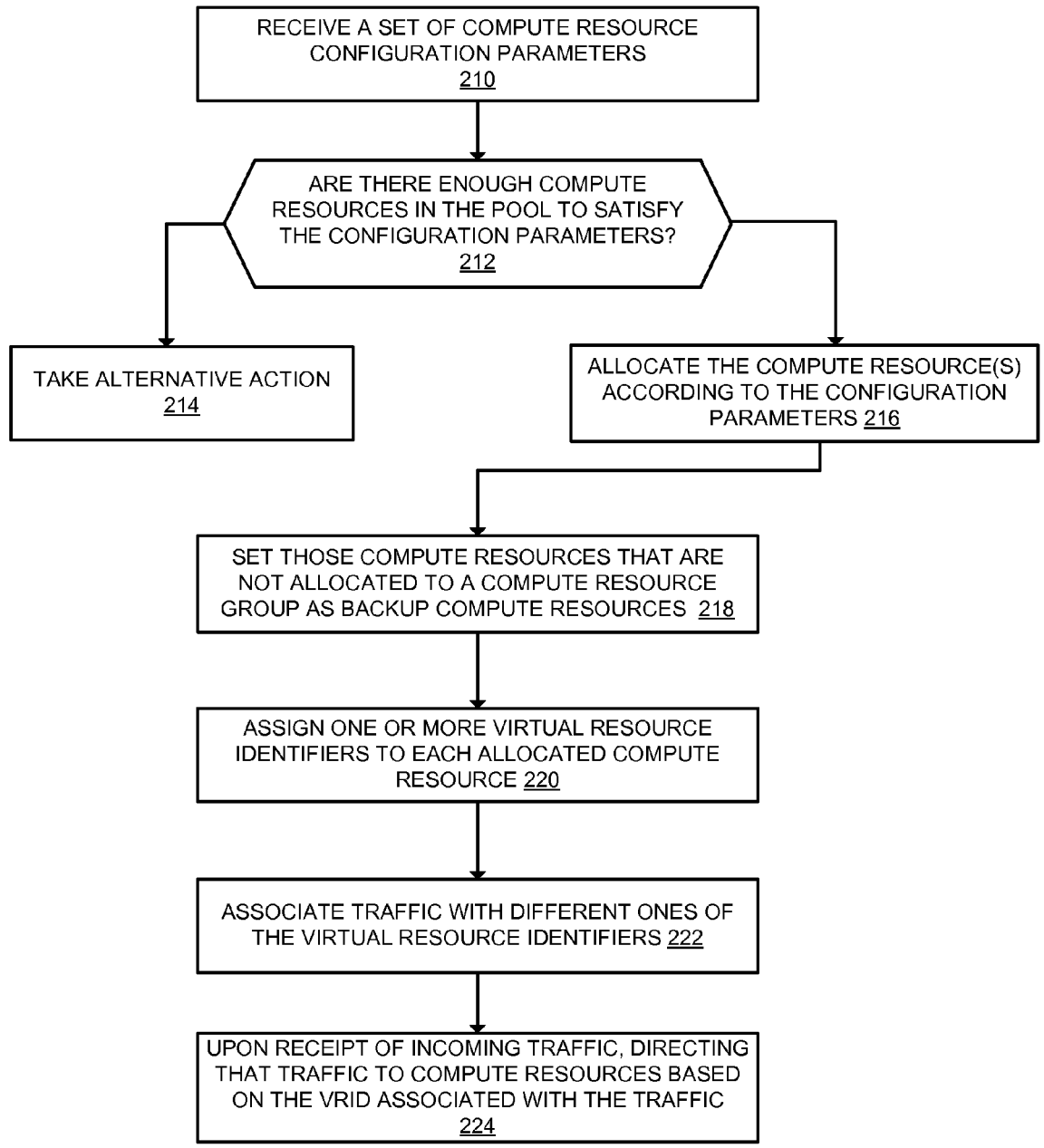
FIG. 2 is a flow chart illustrating an exemplary method for configuring a network element for load balancing and high availability of compute resources according to one embodiment of the invention.

FIG. 2 is a flow chart illustrating an exemplary method for configuring a network element for load balancing and high availability of compute resources according to one embodiment of the invention. The operations of FIG. 2 will be described with reference to the exemplary embodiment of FIG. 1. However, it should be understood that the operations of FIG. 2 can be performed by embodiments other than those discussed with reference to FIG. 1, and the embodiments discussed with reference to FIG. 1 can perform operations different than those discussed with reference to FIG. 2.

At block 210, the compute resource allocation module 172 receives a set of one or more compute resource configuration parameters to create a compute resource group in a compute resource pool. For example, the compute resource allocation module 172 receives the compute resource configuration parameters entered by a system operator through the command line interface 170. For example, the system operator enters configuration parameters including requesting a compute resource group with a number of compute resources (e.g., compute resource group 162 requires two compute resources). In one embodiment, the system operator does not select individual compute resources, but rather only provides the number of compute resources needed for the compute resource group. As an example of creating the compute resource group 160, the system operator provides information through the command line interface 170 that two compute resources are needed for the compute resource group 160 in the compute resource pool 154. In another embodiment, the compute resource configuration parameters include a minimum amount of processing capability for the compute resource group (e.g., compute resource group 162 requires support for 1,000 subscribers, etc.). The compute resource configuration parameters may also include a compute resource group priority value and/or a priority threshold. Flow moves from block 210 to block 212.

At block 212, the compute resource allocation module 172 determines whether there are enough compute resources in the compute resource pool to satisfy the configuration parameters. The status of each of the compute resources in the compute resource cards 110, 112, and 114 is maintained in the compute resource configuration structure(s) 178. For example, the compute resource configuration structure(s) 178 indicates, for each compute resource pool, the number of available compute resources, the number of unavailable compute resources (allocated compute resources), the amount of load for each allocated compute resource, and/or the type of compute resource. If there are enough compute resources to satisfy the configuration parameters, then flow moves to block 216. However, if there are not enough compute resources to satisfy the configuration parameters, then flow moves to block 214. With regard to the above example (two compute resources are needed), prior to the creation of the compute resource group 160 there were a total of three compute resources available in the compute resource pool 154. Since two compute resources were needed for the compute resource group 160, there are enough available compute resources to satisfy the configuration parameters.

At block 214, alternative action is taken. In one embodiment of the invention, if there is already an existing compute resource group with a lower priority value in the same compute resource pool as the requested compute resource group, the compute resources from the existing compute resource group are reallocated to the requested compute source group. In another embodiment of the invention, an error message is communicated to the system operator (e.g., via the command line interface) which provides an alert that the request cannot be satisfied.

At block 216, the compute resource allocation module 172 allocates the compute resource(s) for the compute resource group according to the received configuration parameters. As previously described, in one embodiment, the configuration parameters indicate at least a number of compute resources required for the compute resource group. The compute resource allocation module 172 may allocate the compute resource(s) for the compute resource group in different ways in different embodiments (e.g., random selection of the available compute resources, sequential selection of the available compute resources, etc.). Thus, although FIG. 1 illustrates that the compute resources 120 and 130 have been allocated to the compute resource group 160, it should be understood that any combination of two compute resources in the compute resource pool 154 may have been allocated.

The compute resource allocation module 172 also causes the configuration of the allocated compute resources to be updated in the compute resource configuration structure(s) 178. An example of the compute resource configuration structure(s) 178 will be described in greater detail with reference to FIG. 5A. Flow moves from block 216 to block 218.

At block 218, the compute resource allocation module 172 sets those compute resources that are not allocated to a compute resource group as backup compute resources for the compute resource pool. A backup compute resource is a compute resource that is capable of taking over at least some of the traffic load being served by a compute resource. A backup compute resource may act as a backup compute resource for multiple compute resource groups of a single compute resource pool. For example, with reference to FIG. 1, the compute resources 122 and 142 are backup compute resources since they are not allocated to a compute resource group within the compute resource pool 156. The compute resources 122 and 142 are backup compute resources to the compute resources 124 and 132 of the compute resource group 162, the compute resource 126 of the compute resource group 166, and the compute resources 144 and 146 of the compute resource group 164. Flow moves from block 218 to block 220.

At block 220, the VRID assignment module 174 assigns one or more virtual resource identifiers (VRIDs) to each allocated compute resource, and flow moves to block 222. VRIDs allow for a granular rebalancing in the event of compute resource failures and a reduced number of entry updates upon compute resource failures. For example, when a compute resource fails, a number of system entities that have a reference to the failed compute resource need to be updated to point to the backup or alternate compute resource that will take over the function of the failed compute resource. On typical prior art implementations, such references may be on the order of hundreds of thousands or millions. This of course then becomes a CPU intensive operation to update each of these references. However, the use of VRIDs allow for only a few tables to be updated since individual system components store a reference to the VRIDs which remain unchanged on a compute resource failure instead of a reference to the compute resource itself.

In one embodiment, for a given number (N) of compute resources allocated to a compute resource group, a set of N*(N-1) VRIDs are defined. Those VRIDs are then mapped to the compute resources in the compute resource group. Thus, typically each compute resource allocated to a compute resource group has N-1 VRIDs associated with it during non-failure events. For example, with reference to FIG. 1, two VRIDs are allocated to the compute resource group 160, two VRIDs are allocated to the compute resource group 162, one VRID is allocated to the compute resource group 166, and six VRIDs are allocated to the compute resource group 164 (evenly distributed among the compute resources 142, 144, and 146). However, during failure events of a compute resource, the number of VRIDs associated with a non-failed compute resource may increase to compensate for the failure. For example, as will be described in greater detail later herein, if a compute resource fails (and there are no backup compute resources) in a compute resource group, the VRIDs that are associated with the failed compute resource are remapped to the remaining compute resources in the compute resource group. The remapping may be equal across the remaining compute resources which allows the traffic load associated with the failed compute resource to be evenly shared among the remaining compute resources in the compute resource group.

Figure 5A:
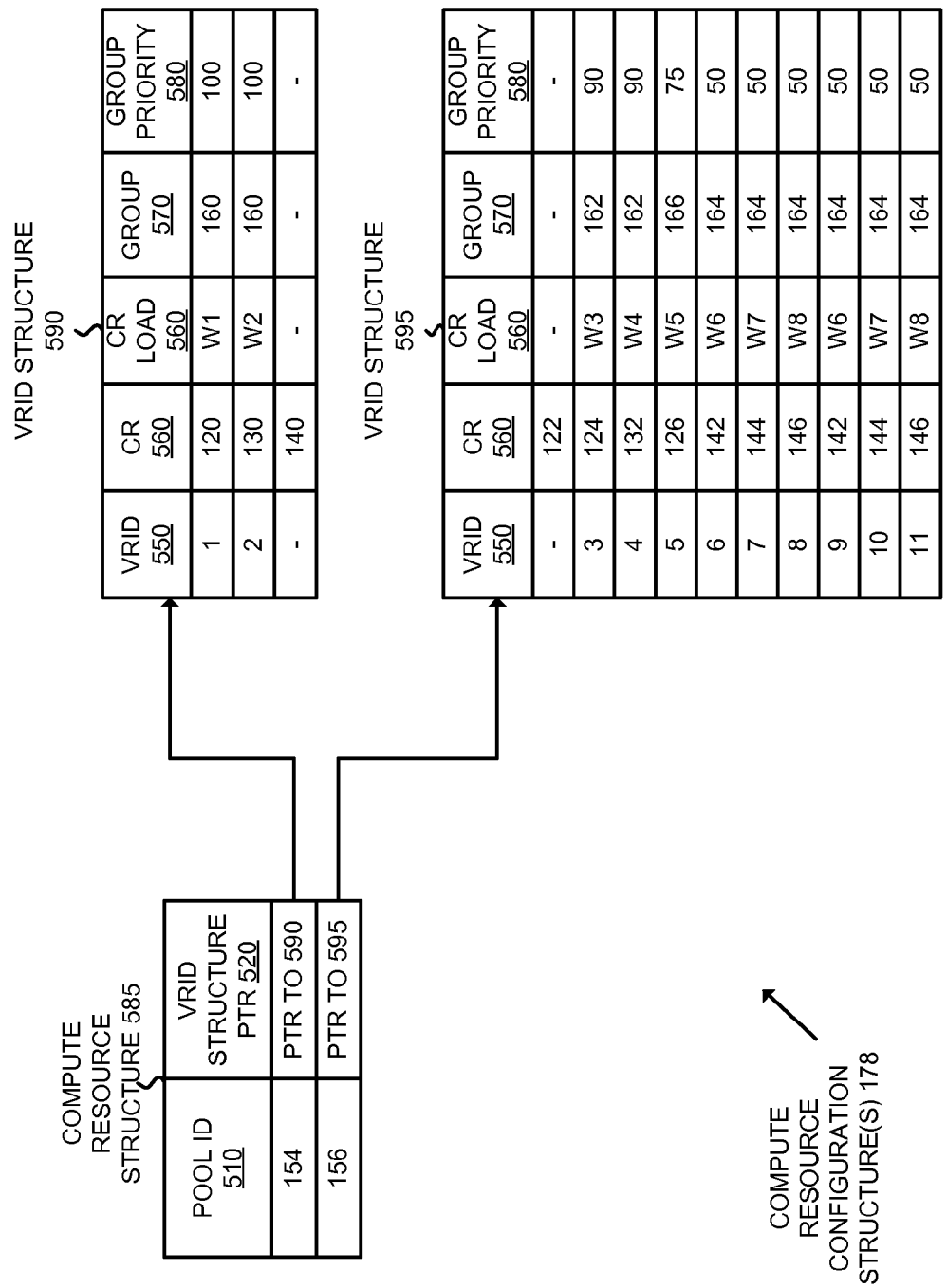
FIG. 5A is a block diagram illustrating an exemplary compute resource configuration structure according to one embodiment of the invention.

The virtual resource identification allocations are stored in the compute resource configuration structure(s) 178. FIG. 5A is a block diagram illustrating exemplary compute resource configuration structures according to one embodiment of the invention. As illustrated in FIG. 5A, the compute resource configuration structure(s) 178 include the compute resource pool structure 585 and the VRID structures 590 and 595. The compute resource pool structure 585 includes the compute resource pool identification field 510 and the VRID structure pointer field 520. The VRID structures 590 and 595 each include the VRID field 550, the compute resource field 560, the compute resource load field 560, the compute resource group field 570, and the compute resource group priority field 580. As illustrated in FIG. 5A, the compute resource configuration structure(s) 178 corresponds with the configuration illustrated in FIG. 1. Of course, it should be understood that the way in which FIG. 5A illustrates the storage of the compute resource configuration data is exemplary, and other alternative storage configurations are within the scope of the invention described herein.

In one embodiment, the VRID assignment module 174 causes the VRID table 134 to be downloaded to all the forwarding entities (e.g., each of the line card(s) 118). The VRID table 134 includes a mapping between a virtual resource identifier and a compute resource. FIG. 6A is a block diagram illustrating an exemplary virtual resource identification table according to one embodiment of the invention. As illustrated in FIG. 6A, the VRID table 134 includes a VRID field 610 and a compute resource field 620. The VRID table 134 is accessed on a per packet and/or per packet flow basis to direct incoming traffic to the correct compute resource. In an alternative embodiment of the invention, instead of downloading the VRID table 134 from the control card 105 to each of the line card(s) 118, each of the line cards locally computes the VRID table 134 based on similar mechanisms as described with reference to the VRID assignment module 174.

At block 222, the VRID assignment module 174 associates traffic (e.g., traffic corresponding to individual subscribers and/or traffic corresponding to contexts) with different ones of the virtual resource identifiers. In one embodiment, different VRIDs are associated with different subscribers and/or different contexts. For example, subscribers are assigned a VRID based on numerous factors such as the context they belong to, the amount of load on a given compute resource, etc. The traffic for a specific context may be assigned a VRID based on the amount of load on a given compute resource at a given time. For example, the control card 105 associates each of the compute resources on the resource cards 110, 112, and 114 with a load. The compute resource load can be based on a number of factors including the current CPU utilization on the compute resource, the expected traffic bandwidth that the compute resource will need to process (based on historical information), the complexity of the services that are enabled on the compute resource, and/or the set of services associated with each traffic flow that the compute resource will process. As described above, the compute resource load for each compute resource is stored in the compute resource configuration structure(s) 178. The compute resource load calculation is performed dynamically and is periodically updated to provide the compute resource allocation module 172 an accurate estimate of the current and expected processing load for each compute resource.

The VRID assignment module 174 uses the compute resource load information to allocate VRIDs (and thus compute resources) to new subscribers and/or new contexts (e.g., to the qualified compute resources which have the least amount of load). In some embodiments, since compute resources with differing processing capabilities (e.g., performance and/or scale capacities) may exist in the network element 100 simultaneously (e.g., newer versions of compute resources with higher performance and older compute resources that cannot perform at the same level simultaneously existing in the same network element), the compute resource load of each compute resource is expressed as a percentage of the maximum available capacity of that compute resource to effectively distribute VRIDs across the compute resources.

Flow moves from block 222 to block 224 where upon receipt of incoming traffic, the line card(s) 118 direct that traffic to the appropriate compute resource based on the VRID associated with the traffic (e.g., by determining the VRID associated with the traffic (packet or packet flow) and corresponding compute resource in the VRID table 134).

Compute resources may fail in certain circumstances. For example, an entire processing card may experience a failure and/or individual compute resources may experience a failure. As one example, an operational compute resource may become non-operational due to operator action, software faults, and/or hardware faults. A failed compute resource state is either classified as a transient failure or a permanent failure. A transient failure is one that is expected to be temporary and will recover after a period of time without replacing the compute resource (e.g., the system operator has taken the compute resource offline (e.g., to install a software/firmware upgrade, to perform maintenance, etc.)). A permanent failure is a failure that is expected to not be recoverable without replacement of the compute resource or when a recovery time is longer than a certain period of time. A transient failure may be considered as a permanent failure after a certain amount of time has elapsed and the compute resource has not become operational.

Figure 3A:
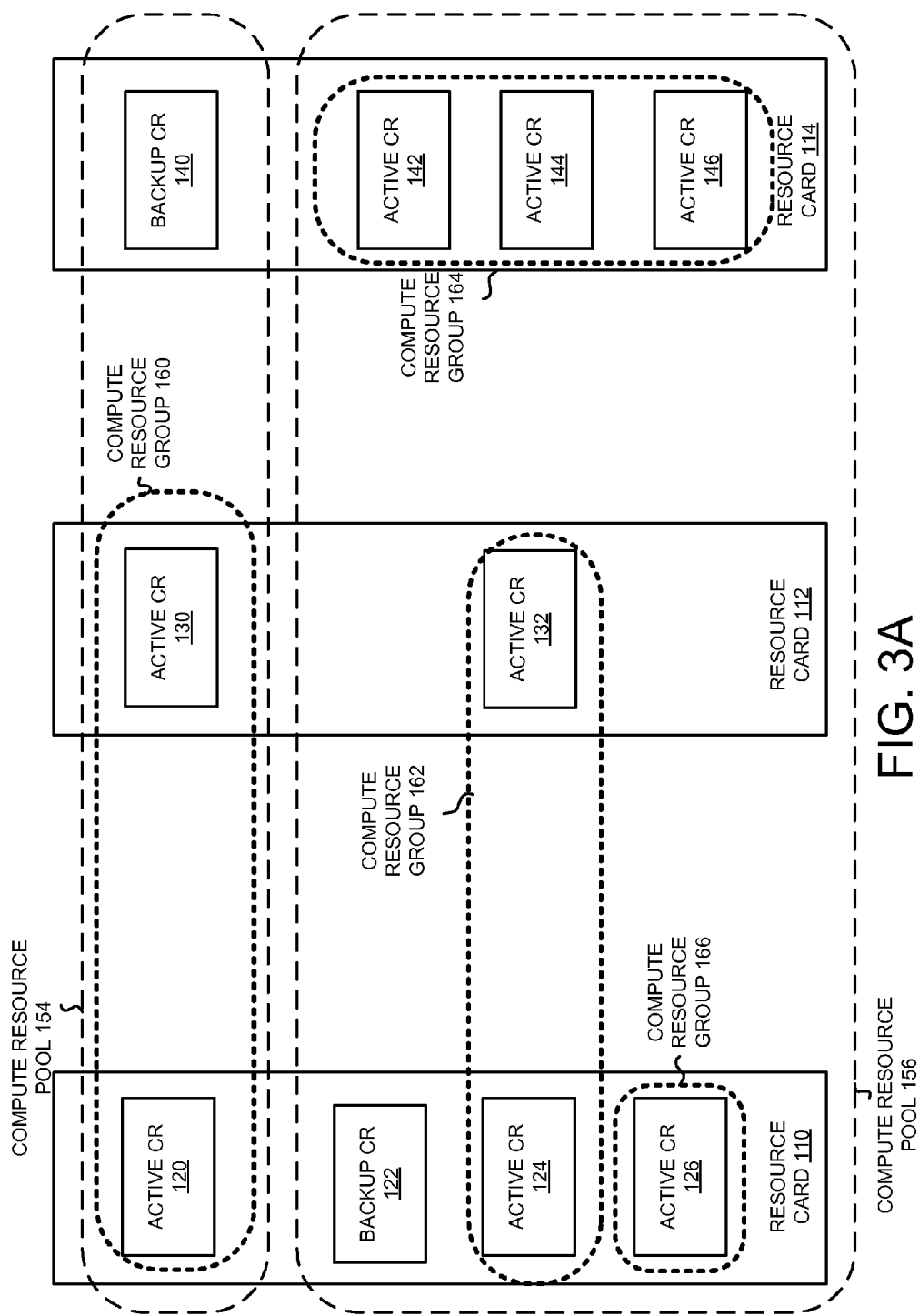
FIG. 3A is a block diagram illustrating an exemplary configuration of compute resources across multiple resource cards according to one embodiment of the invention.
Figure 3B:
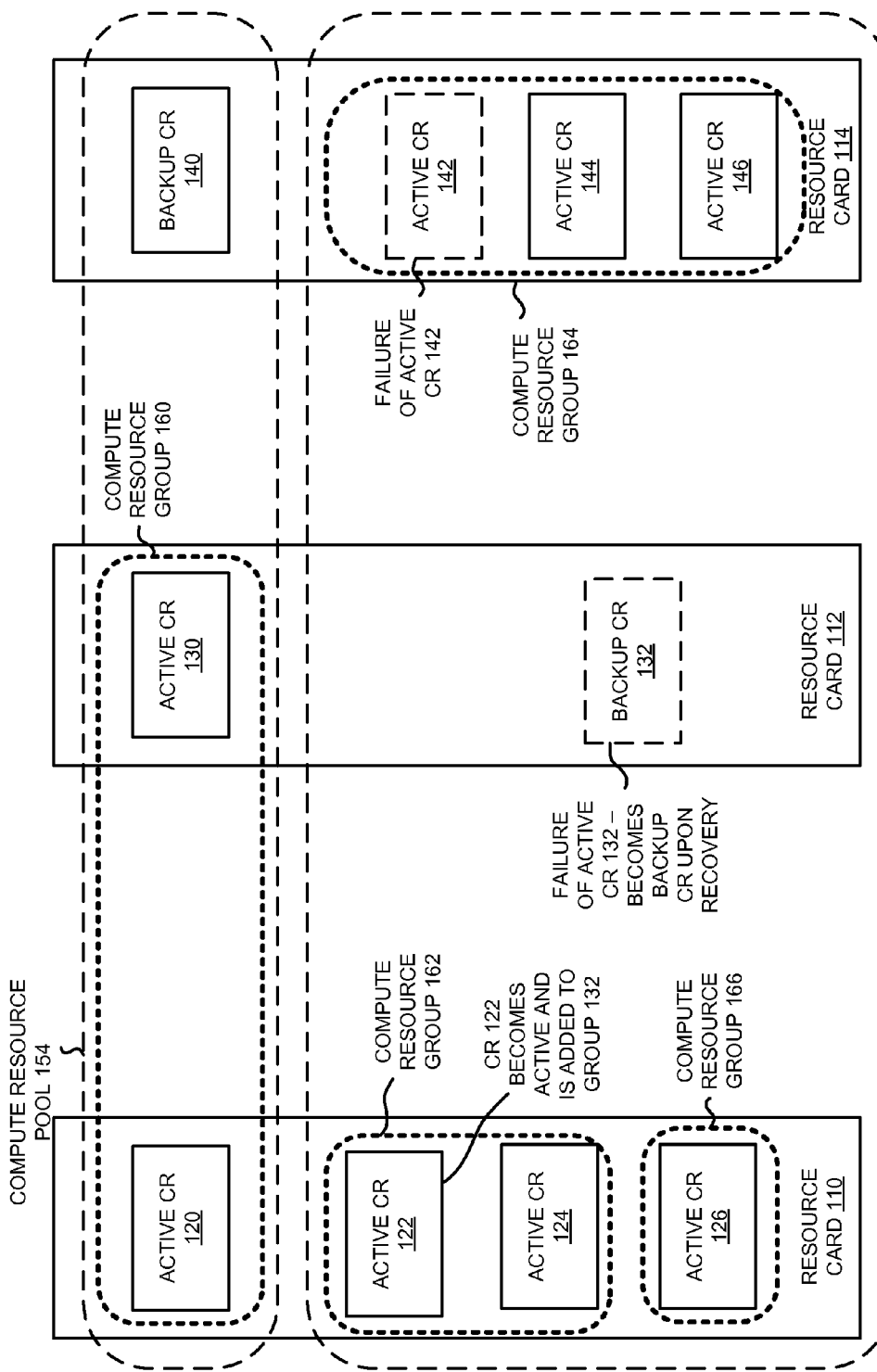
FIG. 3B is a block diagram illustrating the exemplary configuration of FIG. 3A after a failure of a compute resource according to one embodiment of the invention.
Figure 4A:
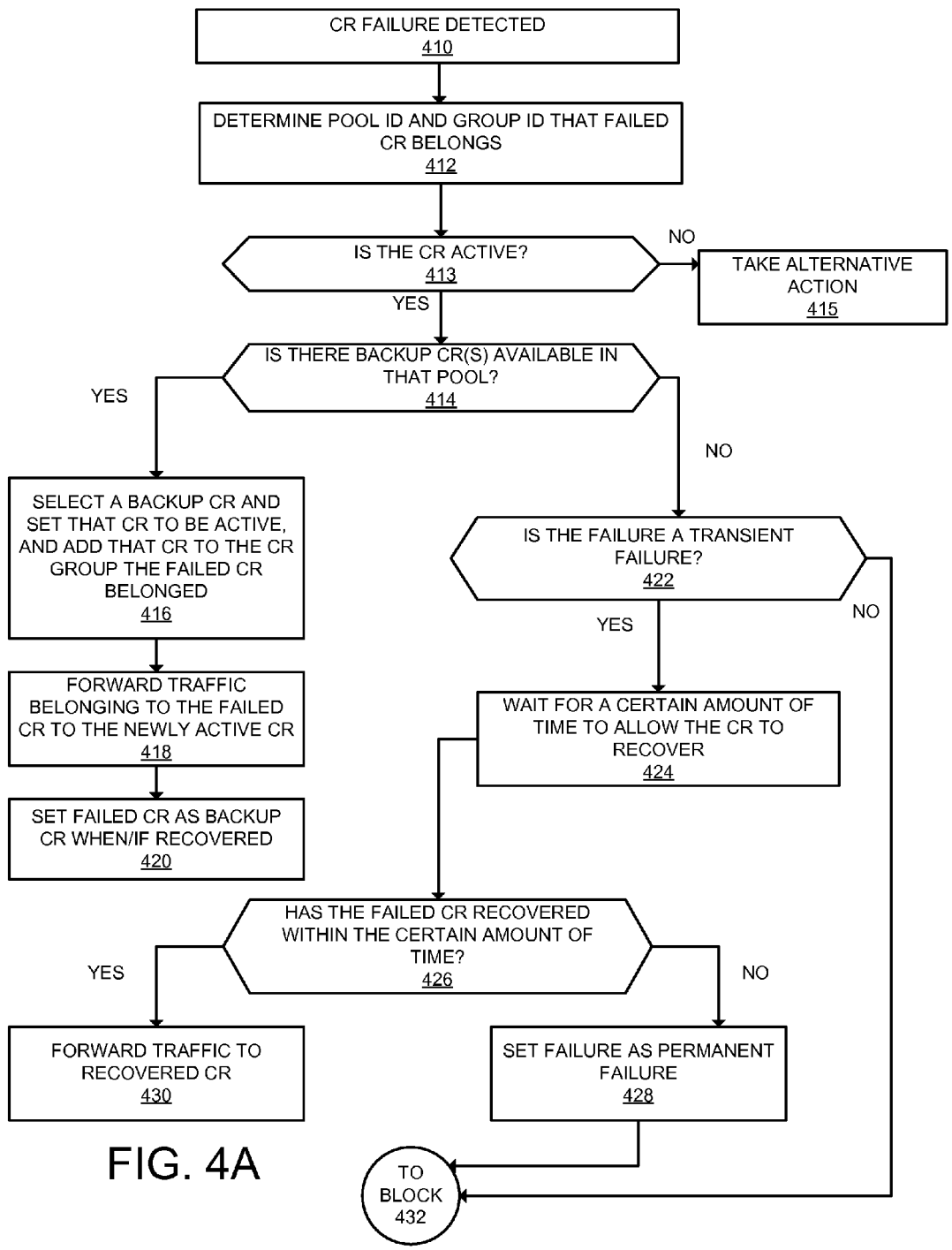
FIGS. 4A-4B are flow charts illustrating recovering from a failure of a compute resource according to one embodiment of the invention.
Figure 4B:
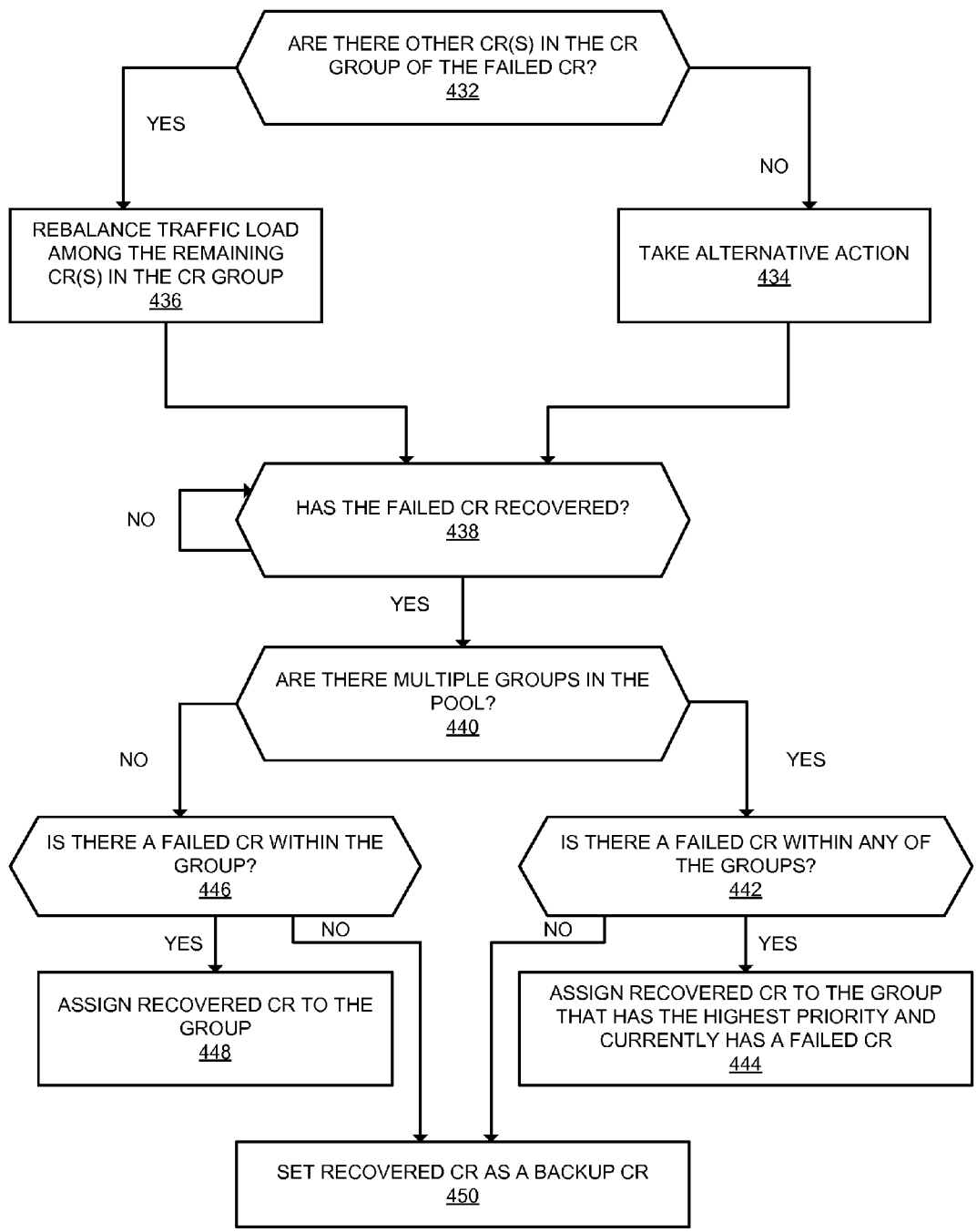

Compute resource fault handling is different depending on whether a backup compute resource is available and whether the failure condition is transient or permanent. FIG. 3A is a block diagram illustrating an exemplary configuration of compute resources across multiple resource cards according to one embodiment of the invention. The configuration illustrated in FIG. 3A is the same as the configuration illustrated in FIG. 1. FIG. 3B is a block diagram illustrating the exemplary configuration of FIG. 3A after a failure of a compute resource according to one embodiment of the invention. FIGS. 4A-B are flow charts illustrating recovering from a failure of a compute resource according to one embodiment of the invention. FIGS. 4A-B will be described with reference to the exemplary embodiments of FIGS. 1 and 3A-B. However, it should be understood that the operations of FIGS. 4A-B can be performed by embodiments other than those discussed with reference to FIGS. 1 and 3A-B, and the embodiments discussed with reference to FIGS. 1 and 3A-B can perform operations different than those discussed with reference to FIGS. 4A-B.

FIG. 4A starts at block 410, where a failure of a compute resource is detected. With reference to FIG. 1, the compute resource monitor module 182, which monitors the status of the compute resources in the network element 100, determines that one of the compute resources has failed. The compute resource monitor module 182 may monitor the status of the compute resources in the network element 100 in different ways as is known in the art. With reference to FIGS. 3A-B, the compute resource 132 of the resource card 112 has failed. The compute resource monitor module 182 passes the identifier corresponding to the failed compute resource to the compute resource failure recovery module 180. Flow moves from block 410 to block 412.

At block 412, the compute resource failure recovery module 180 determines the compute resource pool identification and the compute resource group identification that is associated with the failed compute resource. In one embodiment, the compute resource failure recovery module 180 accesses the compute resource configuration structure(s) 178 to determine the compute resource pool identification and the compute resource group identification. With reference to FIGS. 3A-B, the compute resource 132 is allocated to the compute resource pool 156 and belongs to the compute resource group 162.

Flow moves from block 412 to block 413, where the compute resource failure recovery module 180 determines whether the failed compute resource is an active compute resource or is a backup compute resource. In one embodiment, the compute resource failure recovery module 180 accesses the compute resource configuration structure(s) 178 to determine whether the failed compute resource was an active compute resource or a backup compute resource. If the failed compute resource is an active compute resource, then flow moves to block 414, otherwise flow moves to block 415 where alternative action is taken (e.g., the failed compute resource is removed from its associated compute resource pool until it recovers).

At block 414, the compute resource failure recovery module 180 determines whether there are backup compute resource(s) available in the compute resource pool that the failed compute resource was allocated to. In one embodiment, the compute resource failure recovery module 180 accesses the compute resource configuration structure(s) 178 to determine whether backup compute resource(s) are available. If there is a backup compute resource, then flow moves to block 416, otherwise flow moves to block 422. With reference to FIG. 3B, the compute resource 122 is a backup compute resource in the compute resource pool 156 since it is not currently allocated to any compute resource groups of the compute resource pool 156.

Figure 5B:
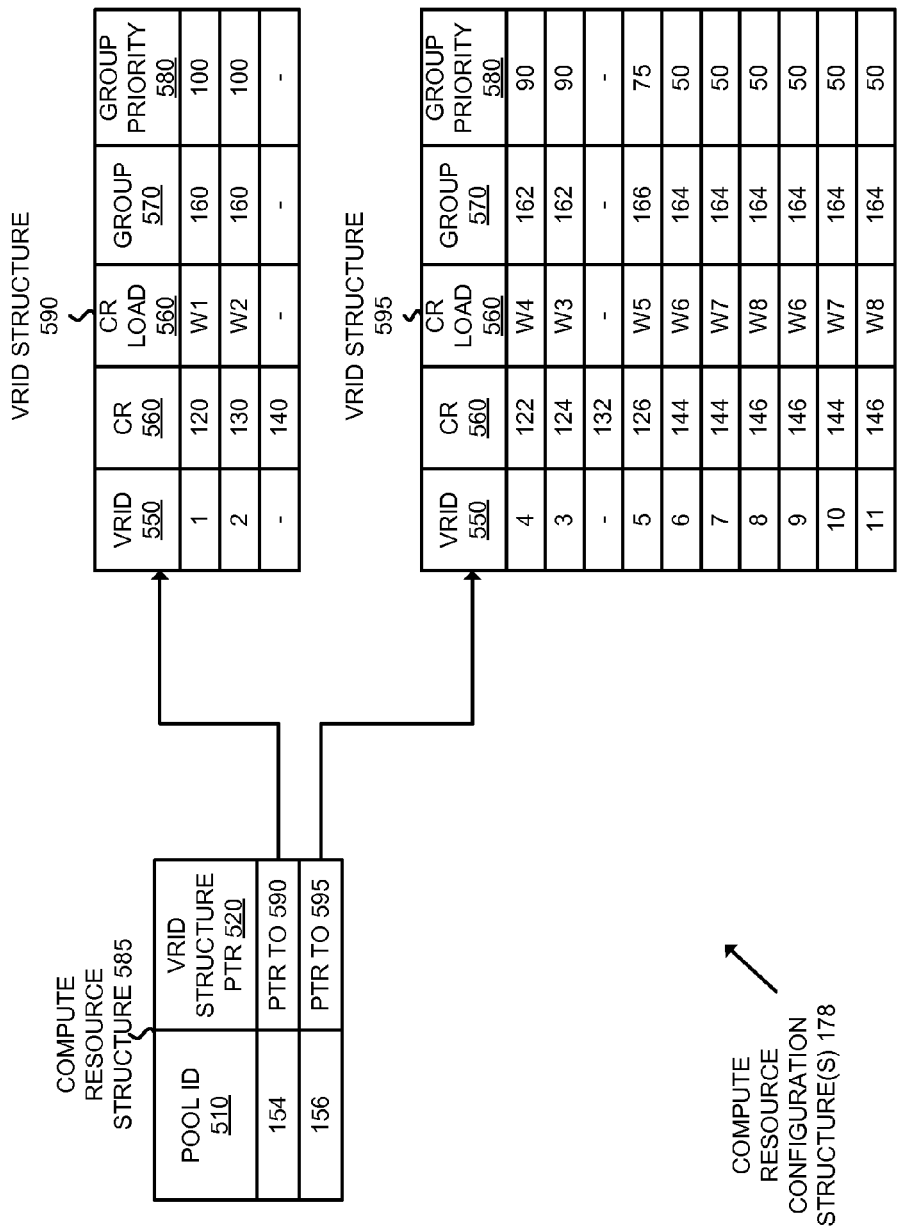
FIG. 5B is a block diagram illustrating the exemplary compute resource configuration structure of FIG. 5A after a failure of compute resources according to one embodiment of the invention.

At block 416 (backup compute resource(s) are available), the compute resource failure recovery module 180 selects one or more of those backup compute resources and sets those selected compute resource(s) as active and adds those compute resource(s) to the compute resource group that the failed compute resource belonged. With reference to FIG. 3B, the compute resource 122 becomes active (takes on the role of the failed compute resource 132) and is added to the compute resource group 162. The mapping between the virtual resource identifier and the compute resource group 162 is switched from the compute resource 132 to the compute resource 122. For example, FIG. 5B is a block diagram illustrating the exemplary compute resource configuration structure 178 illustrated in FIG. 5A after a failure of the compute resource 132 according to one embodiment of the invention. As illustrated in FIG. 5B, the VRID 4 is switched from being mapped to the compute resource 132 to being mapped to the compute resource 122. In addition, the other statistics associated with the failed compute resource (e.g., compute resource group identification, compute resource group priority, load, etc.) are also switched from the compute resource 132 to the compute resource 122.

In addition to updating the compute resource configuration structure(s) 178 on the control card 105, the compute resource failure recovery module 180 causes an updated VRID table 134 with the updated VRID to compute resource mapping to be downloaded to the line card(s) 118. For example, FIG. 6B is a block diagram illustrating the exemplary virtual resource identification table 134 illustrated in FIG. 6A that includes a remapping of the virtual resource identifier 4 to the compute resource 122.

Flow moves from block 416 to block 418, where traffic belonging to the failed compute resource 132 (traffic associated with the VRID 4) is now being directed to the compute resource 122 for processing. For example with reference to FIG. 1, the packet processing unit(s) 136 of the line card(s) 136 directs traffic associated with the VRID 4 to the compute resource 122 of the resource card 110. Thus, with only a few system wide table updates, the traffic from a failed resource can be processed by a backup resource.

Flow moves from block 416 to block 418, where the failed compute resource 132 is set as a backup resource for the compute resource pool 156 if and when it recovers. By adding the failed compute resource as a backup resource if and when it recovers eliminates the need for a further switchover. However, in some embodiments of the invention, when a failed compute resource recovers, it resumes its role as an active compute resource and the compute resource that assumed the role as the active compute resource resumes its role as a backup compute resource.

As described previously, if there is not a backup compute resource available, flow moves to block 422. With reference to FIG. 3B, the compute resource 142 of the compute resource group 164 has failed and there are no backup compute resources in the compute resource pool 156 (assuming that the compute resource 122 and/or the compute resource 132 are not available). At block 422, the compute resource failure recovery module 180 determines whether the failure of the compute resource 142 is a transient or permanent failure. If the failure is transient, then flow moves to block 424, if the failure is permanent, then flow moves to block 432. In one embodiment, the compute resource failure recovery module 180 may determine whether the failure is transient or permanent based on whether the failure is expected (e.g., a failure is expected when a system operator has taken the compute resource offline to perform maintenance and/or install software/firmware).

If the failure is determined to be transient, at block 424 the compute resource failure recovery module 180 waits for an amount of time (e.g., the compute resource failure threshold 188) to allow the compute resource to recover. While in one embodiment the amount of time is non-configurable, in alternative embodiments the amount of time is configurable by the system operator. In one embodiment, during the amount of time waiting for the failed compute resource to recover, the traffic being served by the failed compute resource is not rebalanced among the other compute resources in the compute resource group. However, in other embodiments, during the amount of time waiting for the failed compute resource to recover, the traffic load being served by the failed compute resource is balanced among the other compute resources in the same compute resource group as will be described later herein. Flow moves from block 424 to block 426.

At block 426, the compute resource failure recovery module 180 determines whether the failed compute resource 142 has recovered within the amount of time. If the compute resource has recovered, then flow moves to block 430 where the traffic is again forwarded to the recovered compute resource. If the compute resource has not recovered, then flow moves to block 428 where the failure is set as a permanent failure and flow moves to block 432.

At block 432 (illustrated in FIG. 4B), the compute resource failure recovery module 180 determines whether there are other compute resources in the compute resource group of the failed compute resource (e.g., whether there are other compute resources in the compute resource group 164 besides the compute resource group 142). If there are other compute resources, then flow moves to block 436, otherwise flow moves to block 434 where alternative action is taken (e.g., no action is taken, an alarm is generated for the system operator, traffic is dropped, traffic bypasses the failed compute resource depending on the type of service running on the failed compute resource, etc.). For example, typically encryption (IPSec) and NAT (network address translation) cannot bypass the failed compute resource (this traffic is typically dropped); however, other services (e.g., deep packet inspection traffic management, URL filtering, firewall, IPS, etc.) may bypass the failed compute resource (e.g., traffic would go from an ingress line card to an egress line card without being directed to the resource card of the failed compute resource). With reference to FIG. 3B, the compute resources 144 and 146 are in the compute resource group 164.

At block 436 the compute resource failure recovery module 180 rebalances the traffic load that was served by the failed compute resource 142 among the remaining compute resources (compute resources 144 and 146) in the compute resource group 164 (subject to the available capacity of the compute resources 144 and 146) (e.g., by causing the VRID assignment module 174 to reassign the VRIDs associated with the failed compute resource 142 to the compute resources 144 ad 146). In one embodiment, the VRIDs associated with the compute resource 142 are equally balanced among the compute resources 144 and 146. For example, as illustrated in FIG. 5A, prior to the failure of the compute resource 142, the VRIDs 6 and 8 were associated with the compute resource 142. As illustrated in FIG. 5B, after the failure of the compute resource 142, the compute resource failure recovery module 180 causes the VRIDs 6 and 8 to be associated with the compute resources 144 and 146 respectively. Thus after the failure of the compute resource 142, the compute resources 144 and 146 each are associated with three VRIDs. In addition to updating the compute resource configuration structure(s) 178, the compute resource failure recovery module 180 causes an updated VRID table 134 to be downloaded to the line card(s) 118. For example, FIG. 6B illustrates an updated table 134 that includes a remapping of the VRIDs 6 and 8 to the compute resources 144 and 146 respectively.

Flow moves from blocks 434 and 436 to block 438, where the compute resource monitor module 182 determines whether the failed compute resource 142 has recovered. If the failed compute resource has recovered, then flow moves to block 440, otherwise flow remains at block 438.

At block 440, the compute resource failure recovery module 180 determines whether there are multiple compute resource groups in the compute resource pool that the recovered compute resource is allocated to. If there are multiple compute resource groups, then flow moves to block 442, otherwise flow moves to block 446.

At block 446, the compute resource failure recovery module 180 determines whether there is a permanently failed compute resource within the compute resource group. If there is a permanently failed compute resource, then flow moves to block 448 where the recovered compute resource is assigned to the compute resource group and traffic is rebalanced to distribute the load across the operational compute resources of that compute resource group (e.g., similarly as described above). If there is not a permanently failed compute resource, then flow moves to block 450 where the recovered compute resource is set as a backup compute resource.

At block 442 (e.g., multiple groups in the compute resource pool), the compute resource failure recovery module 180 determines whether there are any failed compute resource within any of the multiple compute resource groups. If there is at least one failed compute resource, then flow moves to block 444, otherwise flow moves to block 450.

At block 444, the recovered compute resource is assigned to the compute resource group that has the highest priority and currently has a failed compute resource and traffic is rebalanced to distribute the load across the operational compute resources of that compute resource group (e.g., similarly as described above).

FIG. 7 is a block diagram illustrating an exemplary architecture of the network element 700 according to one embodiment of the invention. It should be understood that the architecture illustrated in FIG. 7 is exemplary and other architectures may be used in embodiments of the invention. The network element 700 is configured to operate to provide load balancing and high availability of compute resources.

The network element 700 includes the chassis 710, the control cards 715 and 720, the resource cards 725, 730, 735, and 740, and the line cards 745 and 755. Each of the control cards, resource cards, and line cards includes one or more processors and one or more memories. The control cards, resource cards, and line cards are coupled to system bus(es). The control cards may include a machine-readable storage medium on which is stored a set of instructions embodying any one, or all, of the methodologies described herein. In addition, the line cards may include a machine-readable storage medium on which is stored a set of instructions embodying any one, or all, of the methodologies described herein.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for load balancing and high availability for compute resources across a plurality of resource cards, wherein each resource card includes one or more compute resources, comprising:

receiving a set of one or more compute resource configuration parameters;

allocating a plurality of compute resource pools in conformance with the set of compute resource configuration parameters, wherein each compute resource pool includes one or more compute resource groups, wherein each of the compute resource groups includes one or more active compute resources, and wherein at least one of the plurality of compute resource pools includes one or more backup compute resources;

responsive to detecting a failure of a first one of he active compute resources, performing the following:
determining the compute resource pool and the compute resource group that the first failed active compute resource is associated with, and
responsive to determining that the determined compute resource pool currently includes one or more backup compute sources, selecting one or more of those backup compute resources to take over the function of the first failed active compute resource and adding those compute resources into the determined compute resource group associated with the first failed active compute resource; and responsive to detecting a failure of a second one of the active compute resources, performing the following:
determining the compute resource pool and the compute resource group that the second failed active compute resource is associated with, wherein the determined compute resource group includes one or more other active compute resources in addition to the failed active compute resource, and
responsive to determining that the determined compute resource pool does not currently include one or more backup compute resources, rebalancing traffic associated with the second failed active compute resource with the other active compute resources of the determined compute resource group associated with the second failed active compute resource, wherein the set of compute resource configuration parameters includes a priority value for each of the compute resource groups and an indication that at least one of the compute resource pools is operating in preemptive mode, the method further comprising:
responsive to detecting a failure of a third one of the active compute resources, performing the following:
determining the compute resource pool and the compute resource group that the third failed active compute resource is associated with, wherein the determined compute resource pool includes one or more other compute resource groups in addition to the determined compute resource group, and wherein the determined compute resource pool is operating in preemptive mode;
determining the priority value for each of the compute resource groups of the determined compute resource pool;
responsive to determining that the determined compute resource pool does not currently include one or more backup compute resources and that the determined compute resource group has a higher priority value than at least one other compute resource group in the determined compute resource pool, preempting one or more of the active compute resources in that other compute resource group by reallocating those active compute resources to the determined compute resource group to take over the function of the third failed active compute resource.

2. The method of claim 1, further comprising removing the first failed active compute resource from the determined compute resource group.

3. The method of claim 1, wherein the set of compute resource configuration parameters is received at a command line interface from a system operator, and wherein the set of compute resource configuration parameters include a number of compute resources needed for each compute resource group of each compute resource pool, wherein each of those compute resources in a particular compute resource pool that are not associated with a compute resource group referenced by that compute resource pool are assigned as backup compute resources.

4. The method of claim 1, wherein each compute resource pool is associated with a specific service type, and wherein each compute resource group is associated with a context.

5. The method of claim 1, wherein responsive to detecting the failure of the second one of the active compute resources, further performing the following:
determining whether the failure is a permanent failure or a transient failure; and
responsive to determining that the failure is transient, waiting for an amount of time for the compute resource to recover and classifying the failure of the compute resource as permanent if it does not recover in the amount of time.

6. The method of claim 1, further comprising associating one or more unique virtual resource identifiers (VRIDs) with each of the active compute resources, wherein traffic is associated with the VRIDs.

7. The method of claim 6, wherein responsive to detecting the failure of the first one of the active compute resources and selection of the one or more backup compute resources to take over the function of the first failed active compute resource, associating the one or more VRIDs that were associated with the first failed active compute resource with those one or more backup compute resources.

8. The method of claim 6, wherein the rebalancing traffic is performed subject to the capacity of the other compute resources of the determined compute resource group that the second failed active compute resource is associated with, wherein the rebalancing includes distributively associating the one or more VRIDs that were associated with the second failed active compute resource with the other compute resources of that determined compute resource group.

9. A network element for load balancing and high availability for compute resources, comprising:
a control card including,
a compute resource allocation module to allocate a set of one or more compute resources from a plurality of compute resources of a plurality of compute resource pools to each of a plurality of compute resource groups, wherein those ones of the plurality of compute resources of a compute resource pool which are not allocated to one of the plurality of compute resource groups are set as backup compute resources for that compute resource pool,
a virtual resource identification assignment module to assign one or more virtual resource identifiers to each compute resource allocated to a compute resource group,
a compute resource monitor module to monitor operational status of the plurality of compute resources, and
a compute resource failure recovery module to recover from failure of those compute resources that are allocated to a compute resource group, wherein responsive to a failure of a first compute resource allocated to a first compute resource group of a first compute resource pool that includes one or more backup compute resources, the compute resource failure recovery module to cause traffic that was associated with the first compute resource to be directed to one of the one or more backup compute resources;
one or more line cards coupled with the control card each including one or more packet processing units and a virtual resource identification table to direct traffic to appropriate compute resources; and one or more resource cards coupled with the control card and the one or more line cards, each resource card including one or more compute resources, wherein each of the compute resource groups is associated with a priority value, wherein at least one of the compute resource pools is to operate in preemptive mode, and wherein responsive to a failure of a second compute resource allocated to a second compute resource group of a second compute resource pool, the second compute resource pool not including a backup compute resource, the compute resource failure recovery module to perform the following:

determine the priority value for each of the compute resource of the second compute resource pool;

preempt one or more of the compute resources in one or more of the compute resource groups of the second compute resource pool that have a lower priority value than the second compute resource group; and wherein the virtual resource identification assignment module is further to change the assignment of the one or more virtual resource identifiers assigned from the second compute resource to the one or more preempted compute resources.

10. The network element of claim 9, wherein the virtual resource identification assignment module is further to change the assignment of the one or more virtual resource identifiers assigned to the first compute resource to the backup compute resource responsive to the failure of the first compute resource.

11. The network element of claim 9, wherein each compute resource pool is associated with a specific service type, and wherein each compute resource group is associated with a context.

12. The network element of claim 9, wherein responsive to a failure of a second compute resource allocated to a second compute resource group of a second compute resource pool that does not include a backup compute resource, the compute resource failure recovery module to rebalance traffic that was associated with the second compute resource with other compute resources of the second compute resource group.

13. The network element of claim 12, further comprising the virtual resource identification assignment to distributively reassign the one or more virtual resource identifiers that were assigned to the second compute resource with the other compute resources of the second compute resource group.

14. A network element for load balancing and high availability for compute resources, comprising:

a control card coupled with one or more line cards and one or more resource cards, the control card including the following:

a processor to execute instructions; and a memory coupled with the processor, the memory having instructions that, when executed, cause the processor to perform operations including, assigning different ones of a plurality of compute resources from the one or more resource cards to different ones of a plurality of compute resource pools;

creating a plurality of compute resource groups that each reference one of the plurality of compute resource pools, wherein creating each of the compute resource groups includes allocating one or more compute resources to that compute resource group from the same compute resource pool;

setting those compute resources which are not allocated as backup compute resources for the compute resource pool in which they are assigned;

monitoring for a failure of the plurality of compute resources;

responsive to a failure of a first compute resource of a first compute resource group of a first compute resource pool which includes one or more backup compute resources, directing traffic that would have been processed by the first failed compute resource to one of the backup compute resources; and responsive to a failure of a second compute resource of a second compute resource group of a second compute resource pool which does not include a backup compute resource, rebalancing traffic that would have been processed by the second failed compute resource with other compute resources in that second compute resource group;

the one or more line cards each including one or more packet processing units to process traffic, and a memory to store a virtual resource identification table that is used by the one or more packet processing units to direct traffic to compute resources of the one or more resource cards; and the one or more resource cards coupled with the control card and the one or more line cards, each resource card including one or more compute resources, wherein the memory of the control card further stores instructions that when executed, cause the processor to perform operations including the following: setting a priority value for each of the compute resource groups; setting a third one of the compute resource pools as operating in preemptive mode; and responsive to a failure of a third one compute resource of a third compute resource group of a third compute resource pool which does not include a backup compute resource, preempting one of the other compute resources in a different compute resource group of the third compute resource pool that has a lower priority value than the priority value of the third compute resources group, and reallocating the preempted compute resource to the third compute resource group.

15. The network element of claim 14, wherein each compute resource pool is associated with a specific service type, and wherein each compute resource group is associated with a context.

16. The network element of claim 14, wherein the memory further stores instructions that when executed, cause the processor to perform operations including assigning one or more virtual resource identifiers to each compute resource allocated to a compute resource group.

17. The network element of claim 14, wherein the directing traffic that would have been processed by the first failed compute resource to one of the backup compute resources includes changing the assignment of the one or more virtual resource identifiers assigned to the first failed compute resource to the backup compute resource.

18. The network element of claim 14, wherein the rebalancing traffic that would have been processed by the second failed compute resource with other compute resources in the second compute resource group includes distributively reassigning the one or more virtual resource identifiers that were assigned to the second failed compute resource with the other compute resources of the second compute resource group.

* * * * *

UNITED STATES PATENT AND TRADEMARK OFFICE
CERTIFICATE OF CORRECTION

| | |
|---|---|
| PATENT NO. | : 8,122,289 B2 |
| APPLICATION NO. | : 12/421609 |
| DATED | : February 21, 2012 |
| INVENTOR(S) | : Sargor et al. |

It is certified that error appears in the above-identified patent and that said Letters Patent is hereby corrected as shown below:

In Column 15, Line 3, in Claim 1, delete "he" and insert -- the --, therefor.

In Column 17, Line 17, in Claim 9, delete "of" and insert -- groups of --, therefor.

In Column 18, Line 42, in Claim 14, delete "resources" and insert -- resource --, therefor.

Signed and Sealed this
Twenty-sixth Day of June, 2012

David J. Kappos
*Director of the United States Patent and Trademark Office*